S. J. HOMAN.
Horse Rake.
No. 30,222.
Patented Oct. 2, 1860.
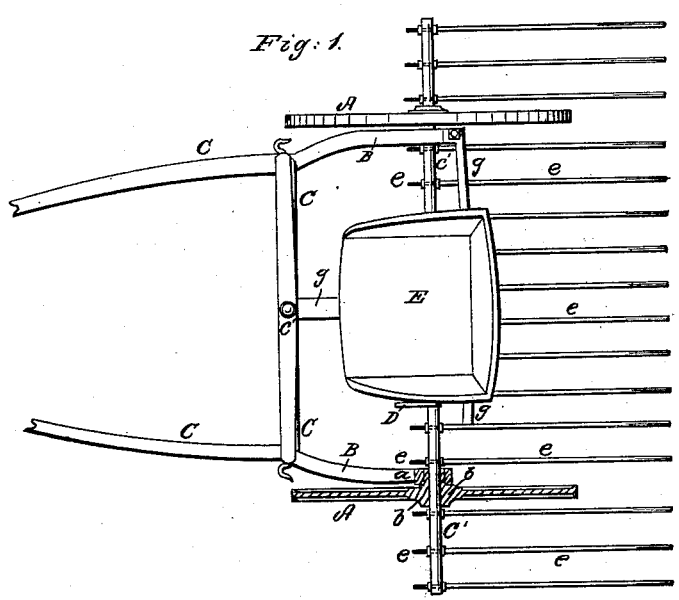
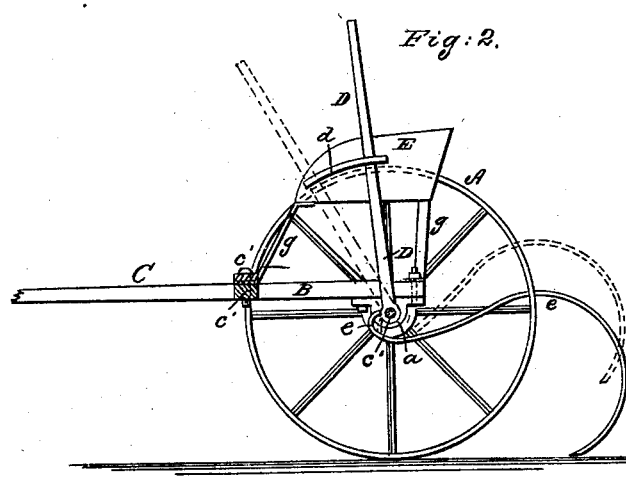

UNITED STATES PATENT OFFICE.

S. J. HOMAN, OF WALDEN, NEW YORK.

IMPROVEMENT IN HAY-RAKES.

Specification forming part of Letters Patent No. 30,222, dated October 2, 1860.

*To all whom it may concern:*

Be it known that I, S. J. HOMAN, of Walden, in the county of Orange and State of New York, have invented a new and Improved Horse Hay-Rake; and I do hereby declare that the following is a full, clear, and exact description thereof, reference being had to the accompanying drawings, making a part of this specification, in which—

Figure 1 is a plan view of the improved hay-rake. Fig. 2 is a sectional elevation of the same.

Similar letters of reference indicate corresponding parts in both figures.

The object of this invention is to construct a more simple and compact horse hay-rake than those hitherto used.

The nature of the invention consists in dispensing with a frame and using the rake-head or bar to which the tines are attached as the axle for the carriage-wheels, thus making the rake-head serve two purposes; and it consists in attaching the rear ends of the thills to hubs which are on the inside of each wheel, and in mounting the driver's seat on the thills, all in the manner hereinafter described.

To enable those skilled in the art to make and use my invention, I will proceed to describe its construction and operation.

In the drawings, A A are two wheels, having a cylindrical portion, *a*, projecting from the inside of each hub *b*. These wheels are made large in diameter, light, and strong.

B B are the two branching ends of thills C C, which have metal eyes on their ends that bear on the cylindrical portions *a a* of wheel-holes *b b*.

*c* is the usual cross-bar, connecting the two thills together, and *c'* is the whiffletree, attached to the bar *c*.

C' is an axle-tree, on which the carriage-wheels A A turn. This axle passes through each wheel-hub and projects out some distance beyond the side of each wheel, and it is capable of being turned in the hubs of the wheels while the wheels themselves are turning. This is done by a hand-lever, D.

*e e e* are the rake-teeth, all of which are bent uniformly in a suitable manner and attached to the axle-tree, which is now made to serve as the rake-head by passing the bent ends through it from the front side and securing them by nuts and collars, as represented in Figs. 1 and 2. The rake-teeth are prevented from bearing too hard on the ground by the hand-lever D, which passes through a sector-guide, *d*, on one side of the driver's seat E.

The driver's seat E is mounted on the thill ends B B by the supporting-strips *g g*, one in front and two behind the seat.

From this description it will be seen that the weight of the driver, instead of pressing upon the axle, (rake-head), will act upon the hubs of the wheels, thus allowing the rake-head to be freely moved by the lever D; and as the play of this lever D is limited by the sector-guide *d* the ends of the rake-teeth will be kept well down on the ground without being forced into the earth. By moving the hand-lever D forward, as indicated by the red line, Fig. 2, the rakes will be elevated, and the machine may be transported from place to place with readiness.

Having thus described my invention, what I claim as new, and desire to secure by Letters Patent, is—

Attaching the rake-tooth to the axle C, and mounting the thills on the hubs of wheels A A and the driver's seat on the thills, substantially as and for the purposes herein set forth.

S. J. HOMAN.

Witnesses:
GEO. S. LITTLE,
NOAH MILLSPAUGH.